United States Patent
Pfannenschmidt

[11] Patent Number: 6,076,831
[45] Date of Patent: Jun. 20, 2000

[54] SWITCH FITTING

[75] Inventor: Erhard Pfannenschmidt, Hamburg, Germany

[73] Assignee: Pfannenschmidt GmbH, Norderstedt, Germany

[21] Appl. No.: 09/041,912

[22] Filed: Mar. 13, 1998

[51] Int. Cl.[7] .............................. F16J 15/20; F16K 25/00
[52] U.S. Cl. ..................... 277/511; 277/522; 277/529; 277/532; 251/214; 251/315.14
[58] Field of Search ..................... 277/510, 511, 277/522, 529, 532, 540; 251/315.08, 315.09, 315.1, 315.14, 214

[56] References Cited

U.S. PATENT DOCUMENTS

| | | | |
|---|---|---|---|
| 2,980,390 | 4/1961 | Anderson et al. | 251/181 |
| 3,445,087 | 5/1969 | Priese et al. | 251/214 |
| 3,458,172 | 7/1969 | Burrows | 251/174 |
| 4,462,568 | 7/1984 | Taylor et al. | 251/135 |
| 4,558,874 | 12/1985 | Williams et al. | 277/532 |
| 4,773,442 | 9/1988 | Lephilibert | 137/315 |
| 5,460,351 | 10/1995 | Holloway | 251/214 |

FOREIGN PATENT DOCUMENTS

| | | |
|---|---|---|
| 1.482.483 | 5/1967 | France . |
| 21 40 975 | 9/1972 | Germany . |
| 26 58 256 | 6/1977 | Germany . |
| GM 78 15 061 | 8/1978 | Germany . |
| 41 04 003 | 8/1991 | Germany . |

*Primary Examiner*—Anthony Knight
*Assistant Examiner*—Vishal Patel
*Attorney, Agent, or Firm*—Faegre & Benson LLP

[57] ABSTRACT

A switch fitting, in particular a cock, ball cock, flap or likewise, with a switch rod for a switch member, which is rotatably and slightly tiltably guided in a switch shaft bore of a fitting housing and which has a sealing surface which is formed on a collar on the side opposed to the switch member, with a sealing ring cooperating with the sealing surface and being supported on a graduation of the switch shaft bore, and with a spring pressing the sealing surface against the sealing ring, wherein the sealing ring has essentially a fine contact with the sealing surface.

16 Claims, 4 Drawing Sheets

SWITCH FITTING

BACKGROUND OF THE INVENTION

The invention relates to a switch fitting.

The sealing of switch shafts with respect to a fitting housing is critical since leakages may occur, in particular on rotation operation of the switch shafts by way of a one-sided lever. Due to this there is exerted onto the switch shaft a tilting moment by way of which on the one hand the seal is pressed together and on the other hand permits the formation of gaps.

From DE-U-78 15 061 there is disclosed a switchable fitting whose switch shaft impinged by pressure, for securing in the fitting housing, has two radial collars axially distanced from one another, with spherical sealing surfaces which in each case are supported on graduations of a two-stepped switch shaft bore via sealing rings with spherical seating surfaces. The switch shaft is pressed and pulled in its sealing seating by the housing inner pressure as well as also by the result of the pretensioning of disk springs, wherein the disk springs on the one side are supported on the outer side of the fitting housing, and on the other side on a counter bearing rigid with the switch shaft. This design has the disadvantage that the inner pressure of the switch fitting as well as a wear of the seals act against the spring pretensioning. The switch shaft can only be tilted with a considerable gap formation between collars and sealing surfaces, since the spherical sealing seatings have radius middle points which are considerably axially displaced.

From DE 21 40 975 there is known a switch shaft seal for switch fittings whose switch shaft comprises an annular collar with plane annular surfaces for the bearing of two seal arrangements in each case of two wedge-like sealing rings engaging into one another. Furthermore DE 26 58 256 discloses a sealing device for the spindle of a fitting in which a sealing ring with a ball-shaped sealing seat is pressed against the spherical sealing surface of a radial collar of the spindle by way of a disk spring. The sealing surface is arranged on the inner-lying side of the collar so that the disk springs are supported on one inner step of the spindle bore and have contact with a medium flowing through. The collar is supported on the outside on a counter bearing rigid with the housing via a plane annular surface so that a tilt movability of the spindle is not effected.

Finally a switch fitting it is known from DE 41 04 003 in which a single collar on the switch shaft forms oppositely lying sealing surfaces which are spherically shaped and which cooperate with correspondingly shaped sealing rings on oppositely lying sides, wherein the spring acts on a pressure ring which bears against the facing sealing ring, in order to press this sealing ring against the collar. With this switch fitting the sealing rings and the collar of the switch shaft are pressed together without play. The compression spring ensures the compensation of manufacturing tolerances, extension variations and wear, so that in the normal case a subsequent setting of the seal is required. By way of the spherical sealing and seating surfaces on both sides of the same collar there is created a gap-free sealing bearing, and deposits by way of connection to the mediums between the switch shaft and the switch shaft bore are avoided. The known design requires high torques for its operation which is also the case for the switch shaft mountings described further above.

SUMMARY OF THE INVENTION

It is the object of the invention to provide a switch fitting with a switch shaft mounting in which tilting moments acting on a sealing ring are avoided and an easy movability on operation of the switch shaft is made possible.

With the switch fitting according to the invention, a line contact between the sealing ring and the sealing surface is provided. Preferably for this, the sealing surface is formed concave in cross section, wherein according to a further formation of the invention also the sealing ring in the bearing region can be formed spherically and according to a further formation of the invention the radius of the curvature of the sealing ring is smaller than that of the sealing surface.

The formation of the switch shaft mounting according to the invention has a list of advantages. By way of the line contact, a sealing on the switch shaft collar is obtained which, also with transverse forces on the switch shaft and thus with a corresponding angle of inclination of the switch shaft, remains intact, so that no product may penetrate into the inner space between the switch shaft and the switch shaft bore. On tilting the switch shaft, no considerable moment is exerted on the sealing ring. The contact line between the sealing ring and the collar may be slightly displaced on tilting the switch shaft, but due to this the sealing is not as such compromised. A further advantage of the solution according to the invention lies in the fact that the required torque for operating the switch member of the fitting is relatively slight.

The design according to the invention finally has the advantage that also with sealing rings of ceramic or metallic material, in spite of relatively slight torques for operation, a secure sealing is achieved. According to a further formation of the invention, in the switch shaft bore there is incorporated a further sleeve-shaped sealing ring which is impinged by a pressure ring which cooperates with the spring, preferably a disk spring. In order also here to keep the torque for operation of the switching member small, the invention provides for a line contact between the disk spring and pressure ring, wherein the pressure ring according to one formation of the invention, in the engagement region with the disk spring, is convexly curved. Furthermore in this manner a uniform pressing of the pressure ring onto the associated sealing ring as well as a uniform adaptation of the sealing ring on the collar of the switch shaft is achieved, also with a tilting of the switch shaft.

Instead of a spring between a stop on the switch shaft and the seal, the seal itself may be formed sprung, for example in the manner that a yielding sealing ring on the outer circumference comprises a recess in which sits a spring, preferably a V-shaped spring and by way of this expands the seal outward in the axial direction and in this manner produces a pressing force on the collar of the switch shaft. A disk spring, as would otherwise be applied, may therefore be done away with. Instead of this an annular or sleeve-shaped component may be applied which is introduced into an expanded section of the switch shaft bore and which for example cooperates with the lower side of a nut which is screwed onto the switch shaft. With the help of the nut therefore the pressing force on the seal may be adjusted. In this manner a predefined pretension force may be exerted. A flange on the cylindrical component ensures that the pretensioning or the presetting does not exceed a certain value in that it bears against the outside of the housing. By way of this an unallowable deformation of the seal on the switch shaft collar is avoided.

The doing away with the disk springs may have a positive effect with regards to the space conditions. Furthermore the disk springs are prone to corrosion in an aggressive environment. Corrosion resistant disk springs are in turn relatively complicated. The sealing ring comprising the spring may for example consist of PTFE and the spring of a spring steel material, for example steel 1.4310, Inconel X 750 or likewise. Such a switch fitting may effectively also be applied in vacuum regions and under temperature fluctuation loading. Wear or changed pretensioning may for example be compensated for by tightening the nut.

For an additional sealing, according to one formation of the invention the sealing ring in the corner region lying diagonally opposite the sealing surface may comprise a recess for receiving an O-ring.

If aggressive mediums are led through the switch fitting, then by a suitable choice of material of the switch member on the one hand and the switch shaft on the other hand it must be ensured that corrosion does not occur. This leads when necessary to an additional expense for these parts. Therefore, according to one formation of the invention between the housing and the switch member formed as a ball there is provided an annular sealing arrangement. For this purpose a sealing ring is employed which sits in an annular recess of the housing and where appropriate can be brought under spring tension into engagement with the surface of the ball. For this purpose, for example the ball with the help of a mounting lying opposite the switch shaft can be pressed against the sealing arrangement, for example by way of the arrangement of a spring between a bearing journal and a recess in the ball. Such a spring may be formed by a disk spring. Such a sealing arrangement may consist of two rings of which the outer one is relatively hard for example of graphite, PTFE or likewise, whilst the inner ring accommodated by the outer ring may for example consist of plastic. With a sealing arrangement of this type it is advantageous when in the recess for receiving the sealing arrangement there is arranged an additional sealing ring which prevents the medium from getting into the switch shaft bore via the recess. The additional sealing ring may for example be an O-ring of graphite, PTFE or similar material, but also of metal. A double-sided mounting has the advantage that static charges of the ball may be led away via the spring and the bearing journal. With this embodiment form forces are not introduced onto the switch shaft sealing rings as is otherwise usually the case with balls mounted against one another. The sealing arrangement between the housing and the ball at the same time assumes the function of a bearing ring.

Another formation of the invention provides that between the housing and the switching member formed as a ball there is arranged a deformable third sealing ring with a V-shaped section, in whose recess is seated a spring which seeks to press the limbs of the sealing ring apart in a manner such that one limb is pressed on the facing surface of the ball. Preferably the spring is likewise V-shaped and is manufactured from a suitable spring acting material, particularly metal. The sealing ring may according to one formation of the invention consist of a plastic material which is enclosed by an elastic material, for example coated. An advantageous arrangement of the third sealing ring according to one formation of the invention lies in the fact that it sits in an annular recess of the housing, which radially borders the switch shaft bore.

The invention has the advantage that no product may get into the switch shaft space. The switch shaft is therefore not attacked by aggressive mediums. For this reason the switch shaft does not have to be manufactured from a costly non-corrosive material. Where appropriate this also leads to a reduction in the dimensions of the switch shaft which positively influences the constructional size of the switch fitting. There results a reduction of the spatial requirements in the region of the switch shaft of 60% or more.

With switch members, for example balls, which were cladded around with PTFE or FEP, the switch shafts did not need to be cladded with these. By way of this however there were created problems in the region of the coupling between the switch shaft and the switch member. The cladding material was often not in the position to resist the relatively high surface pressing. Thus the appearance of corrosion in this region occurred. By way of the measure according to the invention this is avoided.

BRIEF DESCRIPTION OF THE DRAWINGS

The invention is hereinafter described in more detail by way of the embodiments shown in the drawings.

DETAILED DESCRIPTION OF THE INVENTION

Figure 1:
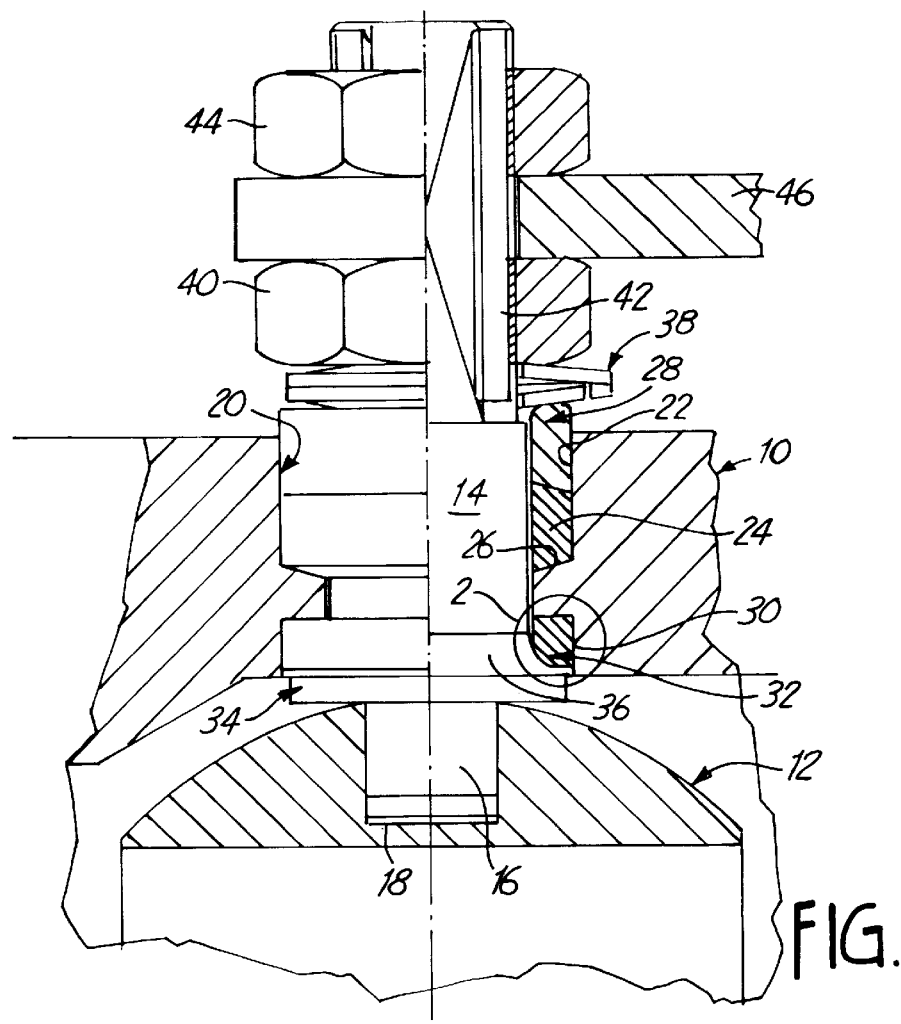
FIG. 1 shows in section a ball cock with a switch shaft mounting according to the invention.

In FIG. 1 a housing 10 of a ball cock is indicated with a ball plug 12 which with the help of a switch shaft 14 can be rotated in that a journal 16 engages into a suitable recess 18.

The housing 10 comprises a bore 20 with a first bore section 22 in which there is arranged a sleeve-shaped seal 24. By way of a reduction in diameter of the bore 22 there is formed a shoulder 26 which falls away obliquely to the bore 20 and on which there is supported the seal 24. The seal 24 is also provided on the upper side with an oblique surface adapted to the oblique surface of the pressure ring 28 which is fittingly seated in the bore section 22. In a lower bore section 30 there is seated a sealing ring 32, the details of which are dealt with later. The sealing ring 32 cooperates with a radial shoulder 34 of the switch shaft 14 which comprises a concavely curved spherical sealing surface 36.

Above the pressure ring 28 there is arranged a spring assembly 38, consisting of two disk springs which can be set under pressure by a nut 40 which is screwed onto a threaded section 42 of the switch shaft 14. Between the nut 40 and a further nut 44 on the switch shaft 14 there is indicated a hand lever 46.

Figure 2:
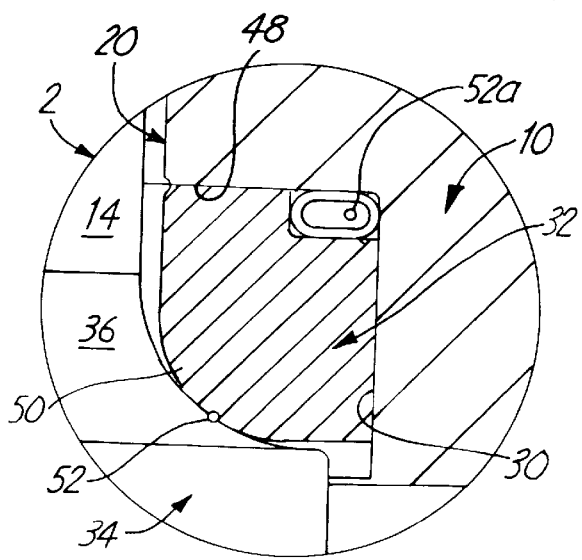
FIG. 2 shows a detail from FIG. 1 enlarged.

FIG. 2 shows the detail 2 according to FIG. 1 (circled in). From FIG. 2 it can be recognized that in the lower bore section 30 a sealing ring 32 substantially rectangular in cross section is arranged, which thus is supported on the shoulder 48 of the housing 10. As can further be recognized the sealing ring 32 on the side facing the collar 34 comprises a convex spherical shape as can be seen at 50. The diameter of the radius of the convex curvature is somewhat smaller than that of the spherical sealing surface 36 so that there is an annular or ring-shaped line bearing between the sealing ring 32 and the sealing surface 36, as is indicated at 52. This line bearing is independent of whether the switch shaft 14 undergoes a tilting inclination, in particular on account of operations. Due to this, the contact line 52 is displaced but the sealing effect remains.

Due to the spring effect of the disk spring 38, the collar 34 is pressed against the sealing ring 32, wherein medium pressure in the inside of the housing 10 further supports this effect. In order to obtain an additional sealing between the sealing ring 32 and the bore section 30 or the shoulder 48, on the corner lying opposite to the spherical curvatures there is applied an O-ring 52a in a corresponding recess.

The sealing ring 32 may consist of any material, for example of metal, graphite, an elastomer or likewise.

Figure 3:
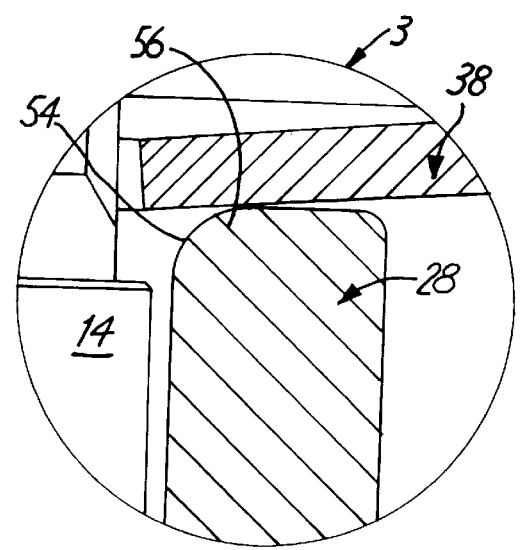
FIG. 3 shows a further detail from FIG. 1.

FIG. 3 shows the detail 3 according to FIG. 1 (circled in). One recognizes that the pressure ring 28 in the upper region is convexly spherically curved on the side facing the switch shaft 14, as is shown at 54. In this manner there results a line bearing 56 on the lower disk spring of the spring assembly 38 by which means the required torque for adjusting the ball plug 12 is reduced. An already mentioned slight inclination of the switch shaft 14 does not compromise the uniform spring pressing and thus the uniform impinging of the sealing ring 24 by the pressure ring 28.

Figure 4:
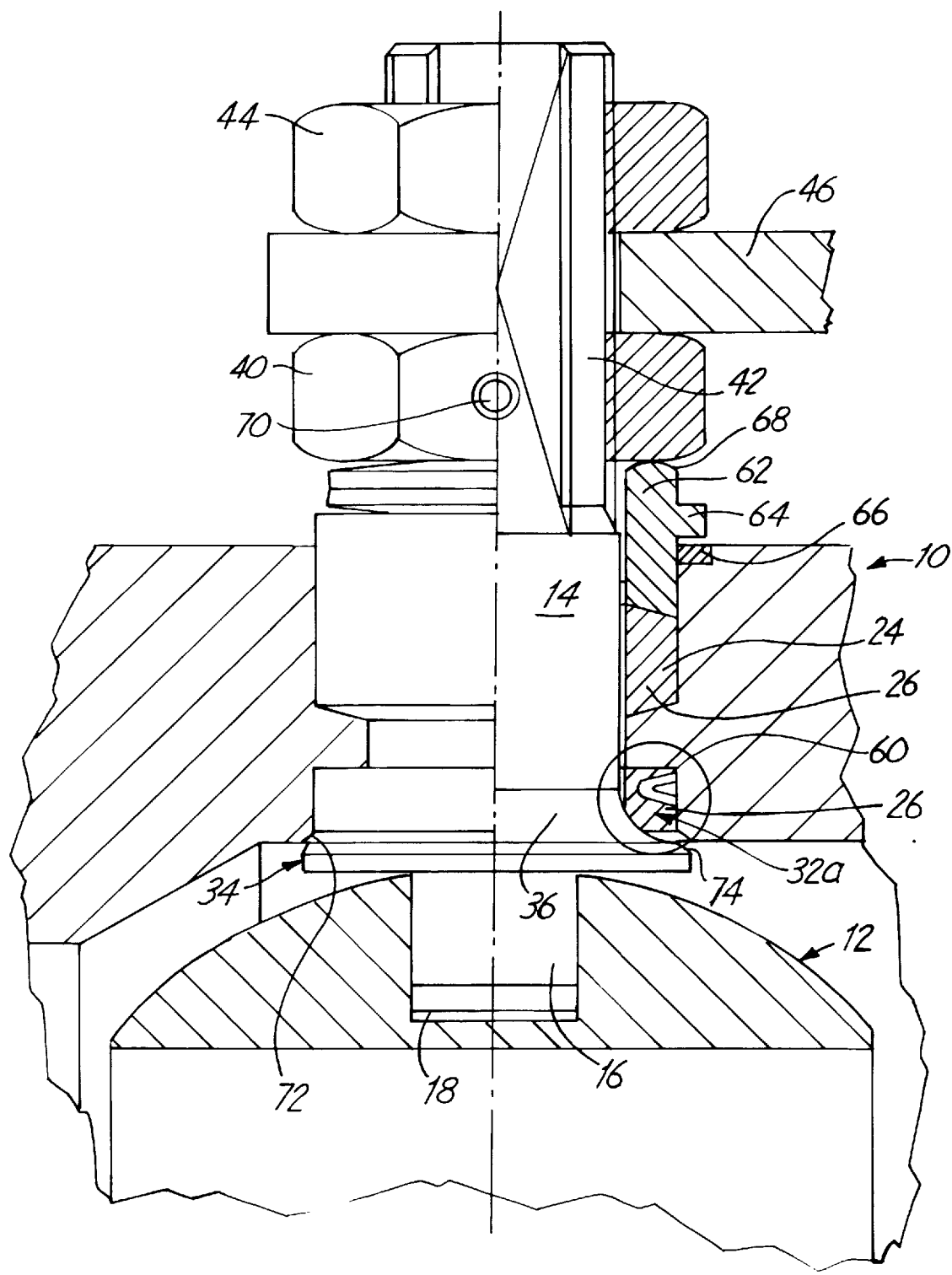
FIG. 4 shows a further embodiment of a ball cock according to the invention.

FIG. 4 is an illustration of two alternative embodiments of the invention. One embodiment is shown in section in the right half of the FIG. 4, while the other embodiment is shown in the left half of the figure. As far as the embodiment form according to FIG. 4 comprises the same parts as FIG. 1, the same reference numerals are applied. As can be recognized from FIG. 4, in a recess 26 of the housing 10 a sealing arrangement 32a is arranged which differs from that shown in FIG. 1 in that in an annular recess which is triangular in cross section, on the outer circumference of the gland-like sealing ring a spring 60 which has a V-shaped section is applied. The spring 60 presses the parts of the sealing ring apart and thus the sealing ring against the collar 34 of the switch shaft 14 to form a gland-like seal. A disk spring, as can be recognized in FIG. 1 (and in the embodiment shown in the left half of FIG. 4), may therefore be done away with (as shown in the embodiment in the right half of FIG. 4). With the help of the nut 40 and a cylindrical component 62 a pretensioning may be created. The component 62 presses on the seal 24 and thus produces a pressing pressure of the collar 34 against the sealing arrangement 32a. The component 62 comprises a radial flange 64 which limits the pretensioning in that it abuts against the outer side of the housing 10. In this region, in the housing there is admitted a small sealing ring 66. Component 62 is rigid, and effectively transfers pressure from nut 44 to seal 24. With the help of the component 62 which at the upper end is cambered at 68, a desired pretensioning may be set or also changed. Furthermore a wear can be compensated for. For this purpose the nut 40 must be rotated on the switch shaft 42. A fastening screw 70 can fasten the rotational setting of the nut 40 on the switch shaft 14.

As can further be recognized from FIG. 4 the housing comprises at the lower end of the switch shaft bore an oblique surface 72. The collar 34 comprises a complementary oblique surface 74. Both oblique surfaces 72, 74, which run annularly, are such that a metallic sealing arises should the sealing arrangement 32a or the seal 24 melt away on account of the effects of heat. In this case then nevertheless a sealing of the bore of the switch shaft 14 is achieved.

It is to be understood that the pretensioning is selected such that still a relatively easy operation of the fitting is possible. The cambered shape of the component 62 also serves the same operation.

Figure 5:
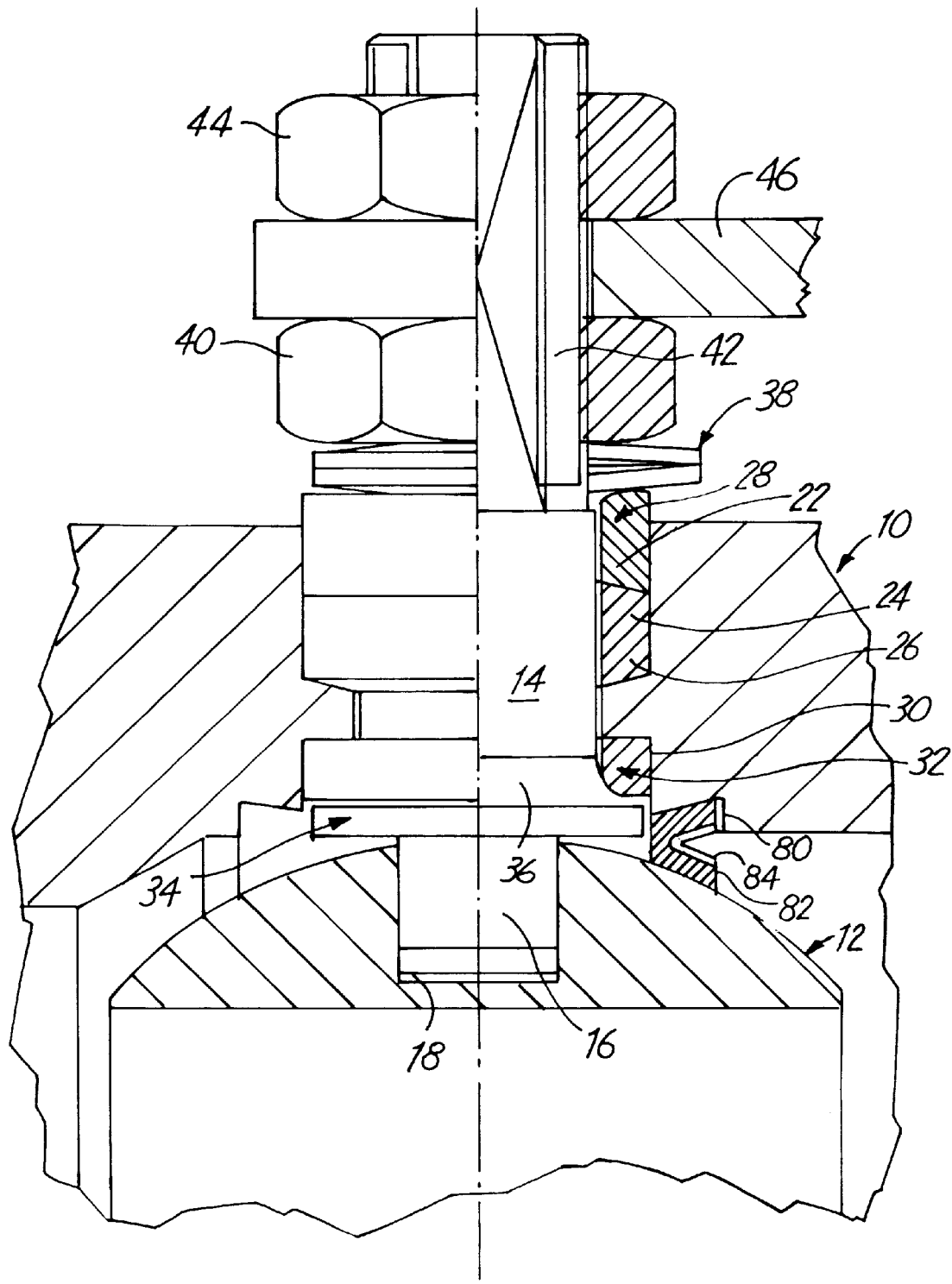
FIG. 5 shows a third embodiment of a ball cock according to the invention.

The ball cock illustrated in FIG. 5 corresponds largely to that according to FIG. 1 so that the same parts can be provided with the same reference numerals. It can be recognized from FIG. 5 that a housing 10a in the region of the switch shaft bore 20 comprises an annular taper disk shaped recess 80 which borders onto switch shaft bore 20. The recess 80 accommodates a third sealing ring 82 which is V-shaped in cross section, wherein the one limb is received by the recess 80 and the other limb bears against the associated surface of the ball 12. The sealing ring 82 consists of a plastic or elastic material. Within the sealing ring 82 there sits an annular spring 84, V-shaped in cross section which seeks to press the limbs of the sealing ring 82 apart.

In the case shown the ball 12 is coated with a suitable material, for example PTFE, wherein however the slot 18 for receiving the journal 16 is not coated, as is neither the switch shaft 14.

The switch shaft 14 may consist of less costly material or with products with higher torque requirements, such as adhesing or briquetting mediums, of torsion resistant material. Since no products may exit the inner space to the switch shaft, also therefore no aggressive medium can attack the switch shaft.

Figure 6:
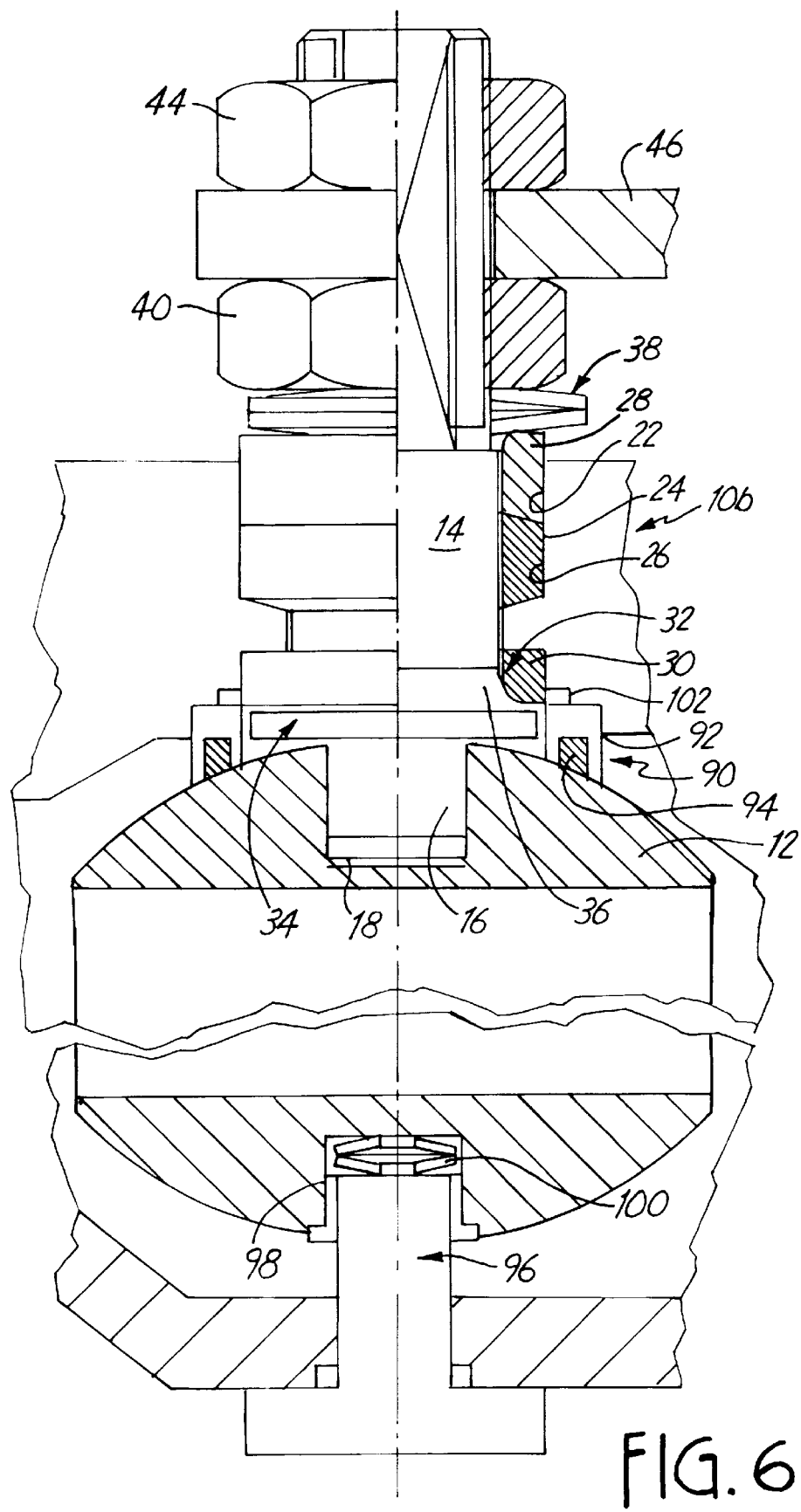
FIG. 6 shows a fourth embodiment of a ball cock according to the invention.

In FIG. 6 again those parts of the embodiment form which correspond to those according to FIG. 1 are provided with the same reference numerals. Further to FIG. 1 the embodiment form according to FIG. 6 comprises a sealing arrangement 90 which consists of a metal ring 92 which on its outer side facing the ball 12 is adapted to the contour of the ball. The metal ring 92 comprises a groove in which there is arranged a plastic ring 94 which protrudes out of the groove and is engaged with the ball. It is however also conceivable to omit the plastic ring 94 and only to use a metal ring or a ring of ceramic which is adapted to the geometry of the ball. Also by way of such a sealing arrangement the penetration of the medium into the switch shaft bore is prevented. A spring pressure can be exerted on the sealing ring 94 or the sealing arrangement 90. In FIG. 6 however the pretensioning is produced differently. The ball 12 is mounted on a side of a bearing journal 96 lying opposite the switch shaft 14, this bearing journal being fastened in the housing 10b and engaging into a recess 98 of the ball 12. Between the upper end of the journal 96 and the floor of the recess 98 there is arranged a disk spring arrangement 100 which consequently pretensions the ball 12 in the direction of the switch shaft 14. The arrangement shown has several advantages. With this embodiment form no forces are introduced onto the switch shaft sealing rings 32 and 34. The sealing arrangement simultaneously assumes the function of a bearing ring. A further advantage lies in the fact that there is achieved an anti-static formation in that static charging of the ball 12 is carried away via the disk springs and the bearing journal 96 and the housing 10b.

The sealing arrangement 90 is arranged in a suitable annular recess in the housing 10b. For its part this is sealed by a sealing ring 102 which is to prevent the medium from penetrating the space of the switch shaft bore. The seal 102 may be an O-ring seal and for example consist of graphite, PTFE or similar material, but may also for example be formed by a metal O-ring.

What is claimed is:

1. A rotary valve comprising:
   a housing having a bore and a cavity, said bore having a recess forming a first shoulder;
   a valve member rotatably supported within said cavity;
   a switching shaft rotatable supported in said bore and coupled with said valve member in order to rotate said valve member upon rotation of said shaft, said shaft having a concave sealing surface;
   a spring positioned to bias said shaft away from said valve member; and a sealing ring substantially rectangular in cross section within said recess of said bore, said sealing ring having a convex sealing surface adjacent to and cooperating with said concave sealing surface of said shaft, said convex sealing surface having a radius of curvature that is smaller than a radius of curvature of said concave sealing surface to establish a line contact between said concave sealing surface and said convex sealing surface independent of the orientation of said shaft and said bore.

2. A rotary valve according to claim 1, wherein the sealing ring in the remaining cross section is rectangular shaped and is supported by a support which is shaped adapted to this.

3. A rotary valve according to claim 1, further including a gland-like seal comprising a seal ring positioned within said bore and a pressure ring which is impinged by the spring and which presses the seal ring against a second shoulder of the bore.

4. A rotary valve according to claim 3, wherein the spring is a disk spring and the pressure ring has a line contact with the disk spring.

5. A rotary valve according to claim 4, wherein the pressure ring, in the engagement region with the disk spring, is curved convexly.

6. A rotary valve according to claim 1, further including a collar positioned between the housing and the valve member, wherein the sealing ring comprises on the outer circumference a recess in which there is arranged an annular V-shaped spring which produces a pressing pressure between the collar and the first shoulder of the housing.

7. A rotary valve according to claim 1, further including a collar positioned between the housing and the valve member, wherein a nut on the switching shaft outside of the housing acts on an annular pressure component which is seated in the bore of the housing for the switching shaft for the purpose of producing a pressure between the collar and the sealing ring.

8. A rotary valve according to claim 1, further including a collar positioned between the housing and the valve member wherein the collar comprises an annular oblique surface, and the housing comprises a complementary oblique surface, these oblique surfaces cooperating in a metallically sealing manner if the sealing ring melts with given heat.

9. A rotary valve according to claim 3, wherein between the housing and the valve member there is arranged a third sealing arrangement which bears on the valve member.

10. A rotary valve according to claim 9, wherein the third sealing arrangement consists of a first ring of rigid material and a second ring of yielding material wherein the second ring sits in an annular groove of the first ring.

11. A rotary valve according to claim 10, wherein a spring arrangement produces a pretensioning between the valve member and the third sealing arrangement.

12. A rotary valve according to claim 11, wherein the pretensioning is produced by a spring, preferably a disk spring, which is arranged between a recess formed in the valve member and the housing.

13. A rotary valve according to claim 9, wherein between the housing and the ball there is arranged a deformable third sealing ring which is V-shaped in section to have first and second limbs with a recess between said limbs and in whose recess there sits a spring which seeks to press apart the limbs of the sealing ring in such a manner that one of the limbs are pressed against the facing surface of the valve member.

14. A rotary valve according to claim 13, wherein the spring consisting of metal is annular and is V-shaped in cross section.

15. A rotary valve according to claim 13, wherein the third sealing ring consists of plastic material which is coated with an elastic material.

16. A rotary valve according to claim 13, wherein the third sealing ring sits in an annular recess which radially borders onto the switch shaft bore.

* * * * *

UNITED STATES PATENT AND TRADEMARK OFFICE
CERTIFICATE OF CORRECTION

PATENT NO : 6,076,831
DATED : June 20, 2000
INVENTOR(S) : Pfannenschmidt

It is certified that error appears in the above-identified patent and that said Letters Patent are hereby corrected as shown below:

Column 6, line 61, delete "rotatable" and insert therefor --rotatably--

Signed and Sealed this

Tenth Day of April, 2001

*Attest:*

NICHOLAS P. GODICI

*Attesting Officer*  *Acting Director of the United States Patent and Trademark Office*